(12) United States Patent  
Cai

(10) Patent No.: US 7,722,541 B2  
(45) Date of Patent: May 25, 2010

(54) MULTIPLE RECEIVE BEAMS FOR RAPID ACQUISITION

(75) Inventor: Anming He Cai, San Jose, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1415 days.

(21) Appl. No.: 11/010,821

(22) Filed: Dec. 10, 2004

(65) Prior Publication Data

US 2006/0173322 A1    Aug. 3, 2006

(51) Int. Cl.  
*A61B 8/00*    (2006.01)

(52) U.S. Cl. ........................ 600/447; 600/443

(58) Field of Classification Search ................ 600/443, 600/407, 437, 472, 447  
See application file for complete search history.

(56) References Cited

U.S. PATENT DOCUMENTS

| 5,511,423 | A  |   | 4/1996  | Sugiyama et al. |         |
|-----------|----|---|---------|-----------------|---------|
| 5,623,928 | A  |   | 4/1997  | Wright et al.   |         |
| 5,779,640 | A  | * | 7/1998  | Holley et al.   | 600/447 |
| 5,976,089 | A  | * | 11/1999 | Clark           | 600/447 |
| 6,309,356 | B1 | * | 10/2001 | Ustuner et al.  | 600/443 |
| 6,482,157 | B2 |   | 11/2002 | Robinson        |         |
| 6,494,841 | B1 | * | 12/2002 | Thomas et al.   | 600/447 |
| 6,508,770 | B1 | * | 1/2003  | Cai             | 600/447 |

* cited by examiner

*Primary Examiner*—Eric F Winakur  
*Assistant Examiner*—Katherine L Fernandez

(57) ABSTRACT

Multiple receive beams are formed for each transmission for rapid acquisition. The receive aperture is shifted as a function of the position of each receive beam. Multiple receive beams with differently positioned apertures are formed in response to a single transmit beam. Alternatively or additionally, the apodization varies as a function of the position of the receive beam relative to the transmit beam. Multiple receive beams with different apodization profiles are formed in response to a single transmission. The apodization and/or aperture variations in different receive beams may reduce geometric distortion and/or clutter levels for receiving multiple beams in response to a single transmission.

26 Claims, 2 Drawing Sheets

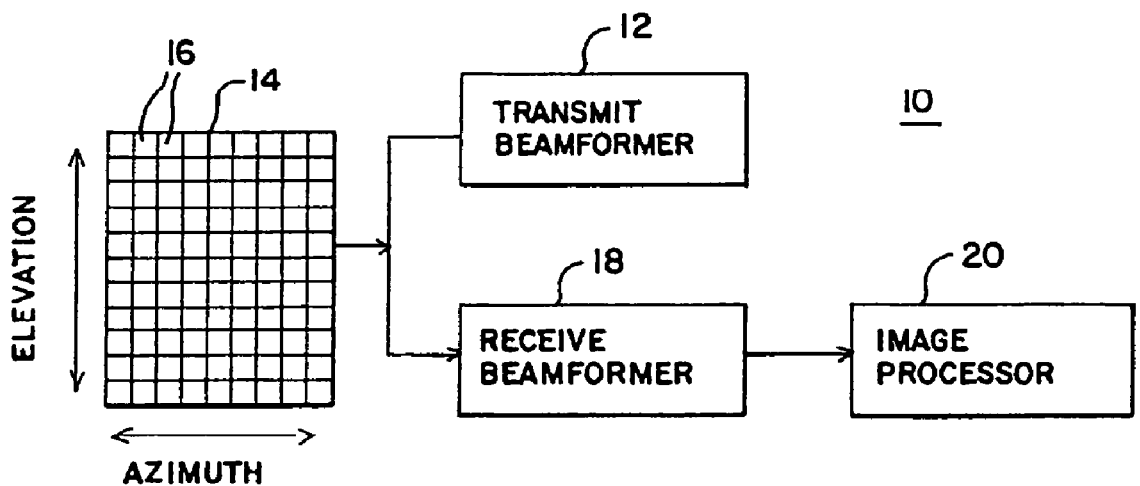
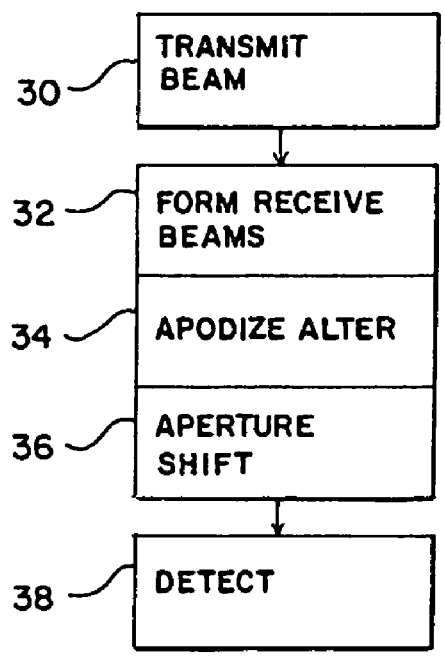

MULTIPLE RECEIVE BEAMS FOR RAPID ACQUISITION

BACKGROUND

The present invention relates to receiving multiple beams for rapid acquisition. In particular, multiple beams are formed in response to each single transmission of acoustic energy with reduced geometric distortion and clutter.

Multiple receive beams are formed in response to a single transmit firing. Forming multiple receive beams for each transmission increases the scan rate. However, the amount of transmitted energy varies as a function of distance from the center of the transmit beam. Receive beams spaced furthest from the center of the transmit beam may be associated with higher levels of geometric distortion and clutter. The two-way spatial response may vary as a function of the location of the receive beams, resulting in shift-variance.

Clutter levels may be reduced. For two dimensional imaging, the position of the receive beams is shifted as a function of distance away from the center of transmit beam. U.S. Pat. No. 5,779,640 deals with multi-beam distortion corrections for two dimensional imaging.

For three dimensional imaging, a plurality of planes or a volume is scanned. To further reduce the scan or increase the frame rate, more receive beams may be formed in response to each transmission. However, the formed two-way beams may introduce undesired clutter and distortion.

BRIEF SUMMARY

By way of introduction, the preferred embodiments described below include methods and systems for forming multiple receive beams for rapid acquisition. The receive aperture is shifted as a function of the position of each receive beam. Multiple receive beams with differently positioned apertures are formed in response to a single transmit beam. Alternatively or additionally, the apodization varies as a function of the position of the receive beam relative to the transmit beam. Multiple receive beams with different apodization profiles are formed in response to a single transmission. The apodization and/or aperture variations in different receive beams may reduce geometric distortion and/or clutter levels for receiving multiple beams in response to a single transmission.

In one aspect, a method is provided for forming multiple receive beams for rapid acquisition. A convergent, focused beam of acoustic energy is transmitted. A plurality of receive beams are formed in response to the transmitted beam. A different apodization for at least a first one of the plurality of receive beams is used than for at least a second one of the plurality of receive beams.

In a second aspect, a system is provided for forming multiple receive beams for rapid acquisition. A transmit beamformer is operable to cause a transducer array to transmit a convergent, focused beam of acoustic energy. A receive beamformer is operable to form a plurality of receive beams in response to the transmitted convergent, focused beam. The plurality of receive beams are formed with a different apodization for at least one of the receive beams than for others of the receive beams. This beam variations of apodization may vary with the receive focus depth.

In a third aspect, a method is provided for forming multiple receive beams for rapid acquisition. A beam of acoustic energy is transmitted. A plurality of receive beams are formed in response to the transmitted beam. The plurality of receive beams are distributed along azimuth and elevation dimensions in a volume. At least one receive beam is formed with different aperture position as compared to at least another of the receive beams.

In a fourth aspect, a system is provided for forming multiple receive beams for rapid acquisition. A transmit beamformer is operable to cause a multi-dimensional transducer array to transmit a beam of acoustic energy. A receive beamformer is operable to form a plurality of receive beams in response to the transmitted beam. The receive beams are distributed along azimuth and elevation dimensions in a volume. A first one of the plurality of receive beams is formed with a different aperture position than a second one of the plurality of receive beams.

In a fifty aspect, a post-detection smoothing filter can be applied across the receive lines that formed from both the same and different transmit lines. These filters may vary based on the receive line location relative to the transmit lines and/or range.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 1 is a block diagram of one embodiment of a system for forming multiple receive beams for rapid acquisition;

FIG. 2 is a flow chart diagram of one embodiment of a method for forming multiple receive beams for rapid acquisition;

DETAILED DESCRIPTION OF THE DRAWINGS AND PRESENTLY PREFERRED EMBODIMENTS

Figure 3:
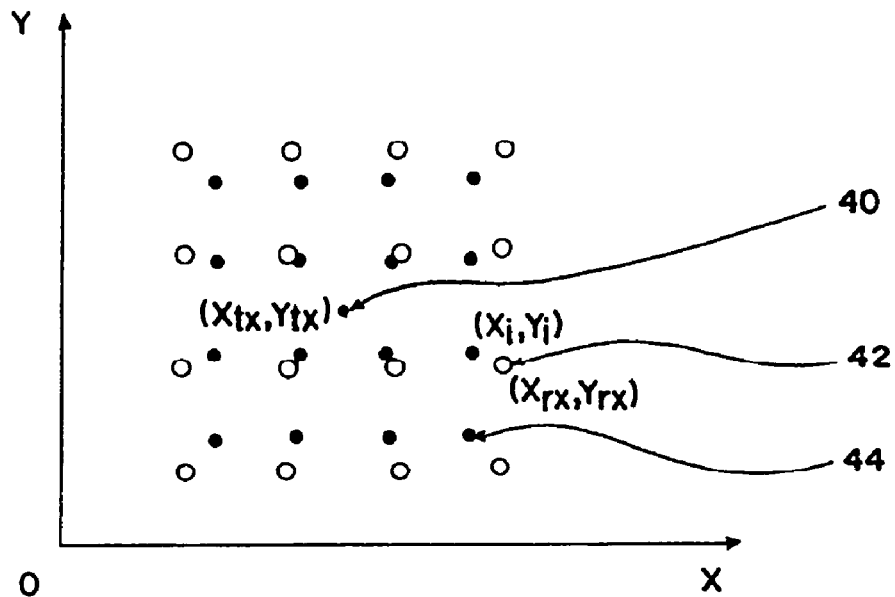
FIG. 3 is a graphical representation of one embodiment of a distribution of receive beams relative to a transmit beam and image lines for volume imaging.

For receiving multiple beams in response to a single transmission, geometric distortion and clutter are generated due to the displacement of the transmit beam energy relative to the different receive beams. At least one of the receive beams is displaced from a center of the transmit beam. To reduce beam geometric distortion, the receive beams may be moved different amounts of distances from an intended image line location. The distance is a function of the distance of the intended image line location from the center of the transmit beam. To reduce clutter level caused by higher acoustic signal levels at a transmit beam center, different receive aperture shapes or apodization for different receive beams are provided. The aperture shape or apodization vary as a function of the location of the receive beam. The receive beams or detected data from each receive beam may be individually amplitude adjusted as well to compensate both the spatial variation of the transmit energy and the apodization and aperture differences between the receive beams.

FIG. 1 shows one embodiment of a system for forming multiple receive beams for rapid acquisition. The system 10 includes a transmit beamformer 12, a transducer array 14 of element 16, a receive beamformer 18 and an image processor 20. Additional, different or fewer components may be provided. For example, a display is provided. The system 10 is a medical diagnostic ultrasound imaging system, such as a cart mounted, portable or hand held system. In other embodiments, one or more components of the system 10 correspond to a work station or personal computer.

The transducer array 14 is a one dimensional or multi-dimensional array of elements 16. For example, a linear, curved or curved linear one dimensional array is provided. A one dimensional array is used for two dimensional or three dimensional imaging. For three dimensional imaging, the one dimensional array is mechanically translated to different positions, such as with a wobbler array. As a multi-dimensional array, the transducer array 14 includes elements 16 distributed in azimuth and elevation dimensions with full or sparse sampling along any type of grid, such as rectangular, hexagonal, triangular, helical or other grids. Multi-dimensional transducer arrays include 1.25, 1.5, 1.75 or two dimensional arrays where the number of elements in an azimuth direction is the same or different than the number of elements in an elevation direction. The multi-dimensional transducer array 14 may be used for generating two dimensional images or three dimensional imaging, such as by electronically steering transmit and receive beams from the same or different origins and/or with the same or different angles in elevation and azimuth directions.

The elements 16 of the array 14 are piezoelectric elements, capacitor elements, membrane elements or other now known or later developed transducer material or structure. The elements 16 may include one or more matching layers, backing block, flexible circuit material, connectors or other structures for communicating with the transmit and receive beamformers 12, 18. The elements 16 are distributed along any desired pitch, such as a 300 micrometer pitch for 2.5 MHz imaging. Greater or lesser pitches that are the same or different along different dimensions may be used.

The transmit beamformer 12 is one or more processor, memory, amplifier, delay, waveform generator, digital-to-analog converter, filter, combinations thereof or other now known or later developed structures divided into a plurality of channels for relatively delaying and amplifying waveforms. Each channel generates a waveform, such as a pulse waveform, for one or more elements. Relative apodization and/or delays are applied to the different waveforms for different elements 16 for focusing the transmitted beam with the desired beam profile. Transmit beam may be steered at any of various angles to the array 14 from any of various origins on the array 14. For example, a plurality of transmit beams are generated in sequence to scan a volume where each transmit beam covers a different spatial region within the volume, such as being spaced along azimuth and elevation dimensions in a scan pattern. Transmit beams overlapping the same regions may be provided. By applying the transmit waveforms of different channels to the transducer array 14, the transmit beamformer 12 causes the transducer array 14 to transmit a beam of acoustic energy. The transmitted beam may be used for two or three dimensional imaging.

Any of various types of transmit beams may be generated. For example, a transmit beam is a plane wave or a divergent beam. In other embodiments, the transmit beam is a convergent, focused beam of acoustic energy. A sufficient or strong focus causes the beam to converge such that a width or region of sufficient energy for imaging is narrower at a focal depth than at the transmit aperture and/or beyond the focal depth. For receiving multiple beams in response to a single transmission, the convergent, focused beam of energy is sufficiently wide at the focal depth to allow formation of received beams at different spatial locations adjacent to the center of the transmit beam. Given a two or three dimensional scan pattern, multiple transmissions of different transmit beams to different regions are used to scan the region of interest. For example, 20 or more transmissions are provided for scanning a region of interest. Hundreds of transmissions may be provided for scanning a volume for three dimensional imaging.

Using a transmit and receive switch, multiplexer or other switches, various channels of the transmit beamformer 12 are connected with different ones of the elements 16. The selected connections define the transmit aperture. In one embodiment, the entire array 14 or all elements 16 are used for the transmit aperture, but lesser apertures may be provided in any of various shapes.

Using a same or different multiplexer, switches or transmit and receive switching, the receive beamformer 18 connects with different ones of or all the elements 16 of the array 14. The receive beamformer 18 uses different aperture positions for different receive beams. For example, each receive aperture is centered on an origin of the given receive beam. Where the receive beams are distributed throughout a volume, the origins may vary. The same aperture shape is then shifted throughout the transducer array 14 for forming the different receive beams. Alternatively, different aperture shapes may be used, such as where one or more of the receive beams is adjacent to an edge of the transducer array 14. In other embodiments, the receive apertures shifts but without being centered relative to an origin of the receive beams from the array 14, such as where the aperture is shifted to be centered relative to a position of the receive beam at a focal depth along a normal line extending to the aperture or array 14.

Different channels of the receive beamformer 18 connect to different elements 16 as a function of a position of the receive beam. Where multiple receive beamformers 18 are provided, different ones of the beamformers 18 may connect with different ones of the elements 16. For example, one receive beamformer 18 connects with one subset of elements 16 for forming one receive beam. A different set of elements 16 connect with another receive beamformer 18 for forming a second receive beam. The second subset of elements 16 is different than the first subsets as a function of the spatial position of the receive beams. Alternatively, signals from different elements 16 are stored in memories or delays for sequentially forming different beams in response to a same transmission. Data from different elements 16 may be selected at different times for forming different receive apertures and associated beams. In yet other alternative embodiments, the receive aperture is the same for two or more, such as all, of the receive beams formed in response to a given transmit beam.

The receive beamformer 18 includes one or more delays, amplifiers, summers, analog-to-digital converters, filters, combinations thereof or other now known or later developed circuitry for receive beamformation. In one embodiment, the receive beamformer 18 includes a plurality of channels for forming a given receive beam. Additional channels are provided for forming different receive beams at a same time. The channels for the different receive beams may have some or no components in common, such as having filtering or analog-to-digital converters in common. In one embodiment, the receive beamformer 18 also includes the multiplexers, switching, transmit receive switch or other components used for selecting the receive apertures for a given receive beam. The components may be on a same or separate processor, card or arrangement within the system 10.

The receive beamformer 18 is operable to form a plurality of receive beams in response to a single transmitted beam, such as in response to a single converging, focused transmit beam. To form a beam, the receive beamformer 18 applies relative delays and apodization with respect to different channels to provide focus dynamically for various ranges along a receive line. The relatively delayed and apodized information is summed together using a single summer or a sequence of summers. The resulting in-phase and quadrature or radio frequency information represents a received beam.

For two or three dimensional imaging, the multiple receive beams are spaced in a plane relative to the transmit beam. In one embodiment, one of the receive beams is co-linear or co-located with a transmit beam, but none are co-located with the transmit beam in other embodiments. For three dimensional imaging, the receive beams may be distributed in both azimuth and elevation dimensions in a volume. The receive beams have a same angle relative to the transducer array 14 or varying angles as the transmit beam. Common or different origins may be provided.

Using amplifiers, analog-to-digital converters, filters and/or other components, the receive beamformer 18 is operable to apply different apodization profiles for different receive beams. The apodization profile is applied by relatively weighting the signals from each of the channels or elements 16 of the array 14 with the desired gain or reduction in signal strength. The apodization profile varies along one or two dimensions, such as varying along an azimuth dimension or along both azimuth and elevation dimensions. The variation is for the different receive beams. The apodization applied for a given receive beam may be uniform, Gaussian, Hamming, Kaiser or other now known or later developed apodization profile. The apodization profile in one or two dimensions is different for one receive beam than for at least one other receive beam formed in response to a same transmit beam. In one embodiment, each receive beam is associated with a unique apodization relative to the other receive beams formed in response to the same transmission. Alternatively, two or more different apodization profiles are applied for three or more receive beams.

The spatial location of the receive beam or an associated imaging line relative to a center of the transmit beam determines the apodization profile. The receive beamformer 18 is operable to apply apodization as a function of an angle in the elevation and azimuth dimensions from first line to a second line along the azimuth dimension for each receive beam. The first line is from a center of the transmit beam to the receive beams. The angle may be relative to other lines than the azimuth dimension, resulting in variation of the angle for different receive beams relative to the azimuth dimension. The apodization in the transducer domain along the azimuth and elevation dimensions varies as a function of the spatial relationship of the transmit beam center relative to the receive beam. Since the receive beams are distributed at different spatial locations, different apodization is applied for different beams.

The image processor 20 is a detector, scan converter, filter, three dimension rendering processor, combinations thereof or other now known or later developed components for generating images or other data based on the receive beamformed information. In one embodiment, the image processor 20 includes a B-mode, Flow-mode, Doppler, Harmonic, multi-pulse contrast agent imaging (see U.S. Pat. No. 6,494,841, the disclosure of which is incorporated herein by reference), combinations thereof or other detectors. The intensity, power, energy, frequency shift, velocity, variance or other characteristic of the received data at fundamental or harmonic frequencies in response to one or a plurality of transmissions is detected.

FIG. 2 shows one embodiment of a method for forming multiple received beams for rapid acquisition. The method of FIG. 2 is implemented using the system of FIG. 1 or a different system. Additional, different or fewer acts than shown in FIG. 2 may be used, such as performing the method without act 34, 36, 38 or combinations thereof.

In act 30, a beam of acoustic energy is transmitted. The beam is transmitted along a scan line, such as one of a plurality of scan lines used for scanning a two or three dimensional region. Using relative delays and apodization, the transmit beam is focused. The region illuminated at a given focal depth is determined by the transmit aperture shape, apodization, frequency and focal depth setting. For a convergent beam, the narrowest area covered at a given depth is at the focal depth. A convergent, focused beam of acoustic energy is generated. For example, a 6 db down point of the resulting beam at the focal depth is inclusive of a first number of scan lines or receive beam positions and excludes others. For three dimensional imaging, the transmit beam is wide enough to cover 4, 16 or other numbers of receive beams. FIG. 3 shows one transmit beam 40 with sufficiently wide energy distribution at a focal depth for reception of 16 receive beams 42 associated with 16 image or scan lines 44. The transmit beam distribution may have a circular or other shape defined by the 6 db down point.

The generated transmit beam 40 is one of a plurality of transmit beams used to scan a two dimensional area or a three dimensional volume, such as three-dimensional scanning with a multi-dimensional transducer array. Each transmit beam is associated with different spatial positions, allowing reception of acoustic energy along different image lines 44. An entire volume may be more rapidly scanned than if only a single receive beam was formed in response to each transmission. By focusing the transmit beam, sufficient energy is provided for forming the receive beams by limiting the amount of energy outside the region needed by the receive beams. Any number of repetitions of the transmit and associated receive operations may be performed, such as a scan format that includes 20 or more transmit beams and associated receive beams to scan a volume of interest. Each transmit beam 40 and corresponding receive beams 42 cover different sub regions within the volume of interest.

In alternative embodiments, a plane or diverging transmit beam is used. All or a subset of the receive beams for a plane or volume may be formed in response to a single transmission.

In act 32, a plurality of receive beams 42 are formed in response to the transmitted beam 40. The acoustic energy in the transmit beam reflects off of tissues, structures or fluids. The reflections are received by the multidimensional transducer array. Each of the elements of the array converts the received energy into an electrical signal. After applying relative delays and apodization associated with each of the receive signals, the signals are summed. The summed signals represent a receive beam. The delays and/or apodization may be changed dynamically as a function of time for receiving at different depths. The delays, apodization and summation are performed on at least some of the same data but with different settings to form the different receive beams.

The amplitude distribution of the transmit beam 40 peaks at the line center can be described by a 3D function $A_{tx}(x-x_{tx}, y-y_{tx}, r)$ where r is the imaging depth and $(x_{tx}, y_{tx})$ is the transmit line center at this imaging depth. For a targeted image line location $(x^i, y^i)$, the corresponding receive beam at the same imaging depth r, is focused at $(x^i_{rx}, y^i_{rx})$ and has the amplitude $A^i_{rx}(x-x^i_{rx}, y-y^i_{rx}r)$, so the two-way beam pattern is given by:

$$A^i_{tx}(x-x^i, y-y^i, r) \approx A_{tx}(x-x_{tx}, y-y_{tx}, r) \cdot A^i_{rx}(x-x^i_{rx}, y-y^i_{rx}, r)$$

which peaks at $(x^i, y^i)$. $(x^i_{rx}, y^i_{rx})$ may be offset from $(x^i, y^i)$ and the difference can be a function of all or some of the following parameters: r, $x_{tx}$, $y_{tx}$, $x^i$, and $y^i$. Since the transmit amplitude $A_{tx}(x-x_{tx}, y-y_{tx}, r)$ peaks at its center $(x_{tx}, y_{tx})$, the two-way beam amplitude may have higher clutter level around $(x_{tx}, y_{tx})$ when $(x^i, y^i)$ is substantially different from $(x_{tx}, y_{tx})$. To reduce clutter where the receive beam is different than transmit beam position, receive apodization and/or aperture shaping is applied differently for different receive beams.

As shown in FIG. 3, the receive beams 42 are distributed in azimuth and elevation dimensions relative to the transmit beam 40 for scanning a volume. FIG. 3 represents the transmit beam 40 and receive beams 42 at a given depth. Sixteen receive beams 42 are formed in response to the transmit beam 40, but other numbers of beams may be formed. None of the receive beams 42 are co-located with the transmit beam 40, but one receive beam 42 may be co-located with the center of the transmit beam 40 in other embodiments. While a rectangular or square distribution of receive beams 42 is shown, other distributions may be used, such as circular or oblong. A greater or fewer number of receive beams 42 may be formed in response to a given transmit beam 40. The receive beams 42 represent the focal locations for the receive aperture.

In one embodiment, the receive beams 42 are positioned at a same position as image lines 44. However, the two-way response due to the distribution of transmitted energy may result in undesired artifacts. Alternatively, the receive beams 42 are over steered to be spaced further away from the center of the transmit beam 40 than the image lines 44. The receive beams are formed with off-sets from the lines of interest or imaging lines 44. The off-sets are a function of the distance of the image lines 44 from the center of the transmit beam 40 to provide a round trip orientation on the image lines 44. The receive beams 42 are over steered because the round trip beams also depend on the orientation of the transmit beams 40. The amount of over steering may be the same for all focal depths or vary as a function of depth. For image lines 44 spaced further from the center of the transmit beam 40, less transmitted acoustic energy is provided. The decrease in acoustic energy provides an apparent further shift in the receive beam for the two way response. Other approaches may be used for correcting multi-beam distortions, such as one or more of the approaches described in U.S. Pat. No. 5,779,640, the disclosure of which is incorporated herein by reference.

To reduce clutter, the receive beams 42 are formed with different apodization in act 34. A different apodization is provided for at least one of the plurality of receive beams 42 than provided for at least another of the plurality of receive beams 42. The apodization for any or all dimensions may be a trade off between resolution and clutter reduction. Greater resolution may be provided by more uniform apodization. Lower side lobes and greater clutter level control or rejection may be provided by more tapered apodization. Apodization may also vary as a function of distance from the center of the transmit beam 40. For example, less apodization or more uniform apodization is provided for receive beams 42 spaced further from the center of the transmit beam 40. The apodization has a different amount of taper, such as applying a first Kaiser profile for one receive beam and a second Kaiser profile with a greater drop off for another receive beam. An amount of taper from uniform may be large or small. For example, signals for apertures at an edge of the aperture are reduced by 10 to 20% in amplitude as compared to elements at the center. Greater or lesser amounts of reduction may be provided symmetrically or asymmetrically. Smooth or stepped transitions in the apodization profile are provided. The type of apodization profile may vary, such as applying a uniform or equal apodization across an entire aperture, for one or more receive beams 42 and a Gaussian, Hamming, Kaiser or other apodization profile for one or more other receive beams 42.

For multidimensional arrays, the apodization profile is a two dimensional surface. For example, one apodization profile is applied along each of the azimuth rows of elements and a different or same apodization profile is applied along the elevation columns of elements. In alternative embodiments, the apodization profile applied along the azimuth dimension varies as a function of elevation position and/or the apodization profile applied along the elevation dimension varies as a function of azimuth position. Other variations of the two dimensional surface as a function of position in either or both dimensions may be provided.

Figure 4:
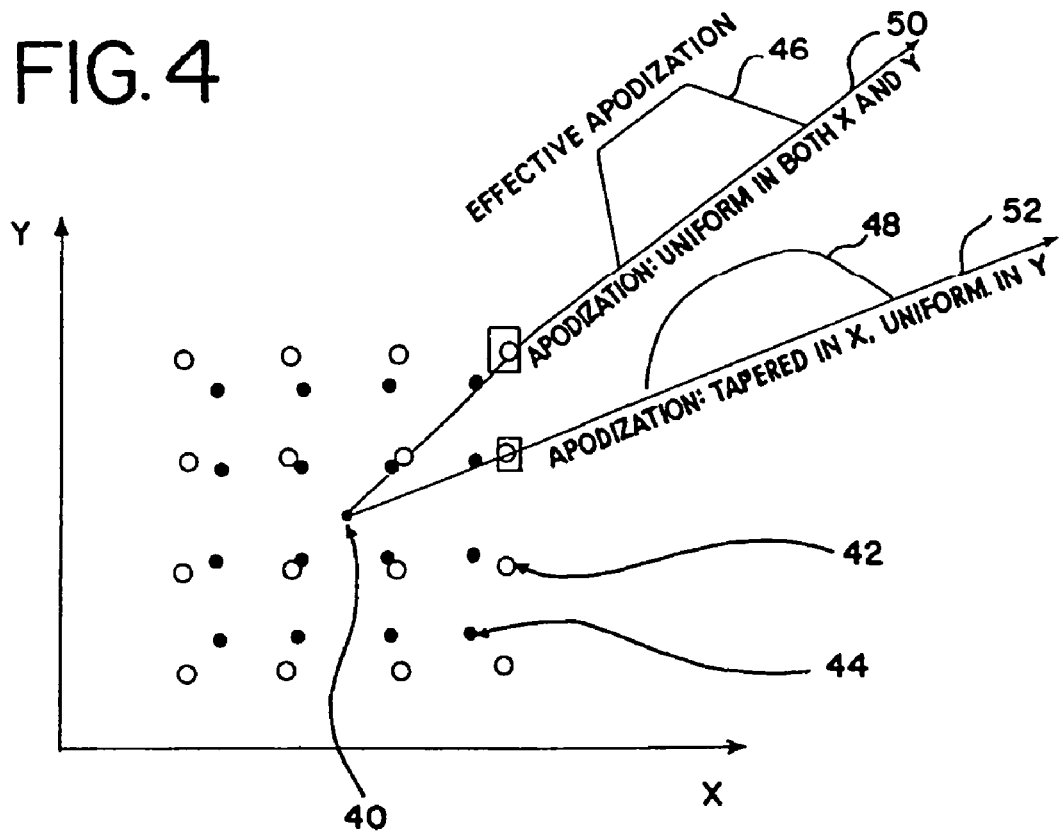
FIG. 4 is the graphical representation of the distribution of FIG. 3 with a relative indication of effective apodization as a function of receive beam position.

An apodization for different receive beams 42 varies as a function of the spatial relationship of the receive beam 42 to the transmit beam 40. The apodization is varied as a function of angle to provide an effective tapered apodization along the direction of a line connecting the transmit position with the receive position. A more uniform apodization is desired along a perpendicular direction. The effective apodization is apodization provided along the dimension or line 50, 52 of interest. For example, apodization is applied as a function of an angle in elevation and azimuth dimensions from a center of the transmit beam 40 to the corresponding receive beam 42 (i.e., the angle between an azimuth plane and a plane passing through the transmit beam center and receive beam at a given depth). Using the distribution of receive beams shown in FIG. 3, FIG. 4 shows lines 50 and 52 extending from the center of the transmit beam 40 through receive beams 42. The angular relationship in the plane of FIG. 4 where X is the azimuth dimension and Y is the elevation dimension is used for determining apodization. The azimuth and elevation dimensions shown in FIG. 4 correspond to the azimuth and elevation distribution of elements of the multidimensional transducer array.

An apodization with a greater amount of taper is applied along the azimuth dimension for angles closer to the azimuth dimension as represent by the line 52 in comparison to the line 50. An apodization with a greater amount of taper is applied along the elevation dimension for angles closer to the elevation dimension, such as represented by the line 50 in relationship to the line 52. In one embodiment, a uniform apodization profile is provided along the elevation dimension of an aperture for the receive beam 42 along line 52 and other receive beams more perpendicular than parallel with the elevation dimension. For receive beams 42 associated with a line through the center of the transmit beam 40 at angles of 45° or less to the elevation dimension Y, a more tapered apodization profile is applied along the elevation dimension, such as a Kaiser, Gaussian or Hamming apodization. A similar approach is provided relative to the azimuth dimension. For example, the effective apodization of the receive apertures for the receive beams 42 along the line 50 is provided by a uniform apodization along both elevation and azimuth dimensions. For the receive beams 42 along the line 52, an apodization profile tapered along the azimuth dimension and uniform along the elevation dimension is provided. An amount of tapering, other types of apodization profiles, apodization profiles different in other aspects or a former resolution of adjustment as a function of angle may be provided in other embodiments. The azimuth and elevation apodization are more uniform for angles more perpendicular to the azimuth and elevation dimensions, respectively. In alternative embodiments, the reverse relationship is provided. In yet other alternative embodiments, the relationship along the azimuth dimension is different than the relationship along the elevation dimension.

As an alternative or in addition to using different apodization profiles for different beams, different aperture shapes are provided for different receive beams 42 in act 36. Different aperture shape is provided by selecting different elements in a different configuration, moving a position of the aperture, altering a contour of the aperture, increasing the sampling density in an aperture, combinations thereof or other aperture alterations. For example, at least one of the receive beams 42 is associated with a different aperture position than at least one of the other receive beams 42. Each receive beam 42 is associated with a different aperture position. The aperture position of each of the receive beams 42 is centered at an origin of the receive beam 42 from the transducer array. Signals from elements outside of the aperture are not used for forming the receive beam. For receive beams 42 that originate from adjacent an edge of the transducer, the aperture may be the same as an adjacent receive beam 42 or may be smaller. For receive beams 42 at a non-normal angle to the transducer array, the aperture may be centered over a focal region of a receive beam, such as altering the receive aperture as a function of time for receiving from different depths or centered over a line extending normal to the transducer array to an intersection of the receive beam with the transmit focal region. Other aperture alterations may be provided as a function of position.

In act 38, the data from the different receive beams received in response to a single transmit beam 40 are detected. The amplitude, intensity, power, velocity, variance or other characteristic of the in-phase and quadrature or radio frequency information is detected. Log compression may be applied. In one embodiment, the detection is performed on data free of synthesis prior to detection. All of the data for a scan frame or volume is provided free of synthesis of additional line data representing spatial locations between actual receive lines. In alternative embodiments, one or more receive lines are synthesized by coherent summation or other techniques. The synthesized lines are formed from beams associated with received acoustic energy at different spatial locations. In yet other alternative embodiments for volume scan, one or more receive lines are synthesized along one of the two dimensions.

Other processes may be performed for forming receive beams or generating images. For example, the brightness associated with different imaging lines on the display is balanced by applying different amplifications to the receive beam data. The amplification is performed prior to or after detection. The amplification of the data is adjusted as a function of the acoustic energy drop-off in the transmit beam 40 relative to the receive beams 44. A linear artifact associated with some receive beams being exposed to greater transmit energies is adjusted or minimized by amplification. Alternatively, a filtering or reduction in signal strength for receive beams closer to a transmit beam center is performed.

For two or three dimensional imaging, the receive beams 42 and associated image lines 44 may be distributed linearly along one dimension for a given depth or within a plane. The apodization and/or aperture may be altered as a function of distance of the receive beam from the center of the transmit beam or as a function of position of the receive beams 42 relative to the transducer array. The apodization of an aperture may vary along only the dimension of distribution of the receive beams 42 for use with a linear or multidimensional array or along one or more dimensions for use with a multi-dimensional array.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A method for forming multiple receive beams for rapid acquisition, the method comprising:
   (a) transmitting a convergent, focused beam of acoustic energy;
   (b) forming a plurality of receive beams with a single beamformer in response to the transmitted convergent, focused beam of (a); and
   (c) performing (b) with a different apodization profile for at least a first one of the plurality of receive beams than for at least a second one of the plurality of receive beams, the apodization profiles corresponding to weighting of channel data for forming the receive beams.

2. The method of claim 1 wherein (a) comprises transmitting the convergent, focused beam having a 6 dB down point including only sixteen or fewer receive beam locations.

3. The method of claim 1 further comprising:
   (d) detecting data from the plurality of receive beams, the receive beams free of line synthesis prior to detection.

4. The method of claim 1 further comprising:
   (d) repeating (a), (b), and (c) at least twenty times for a single scan of a volume of interest, each repetition corresponding to different sub-regions within the volume of interest.

5. The method of claim 1 further comprising:
   (d) performing (b) with a different aperture position for at least the first one of the plurality of receive beams than for at least the second one of the plurality of receive beams.

6. The method of claim 5 wherein (d) comprises centering the aperture position of each of the plurality of receive beams at a respective origin for each of the plurality of receive beams.

7. The method of claim 1 wherein (b) comprises forming the plurality of receive beams with spatial offsets from lines of interest, an amount of the off-sets being a function of a distance from a transmit center to the respective line of interest.

8. The method of claim 1 wherein (b) comprises forming the plurality of receive beams distributed along azimuth and elevation dimensions in a volume.

9. The method of claim 1 wherein (c) comprises applying apodization as a function of angles in the elevation and azimuth dimensions of a line from a center of the converging, focused beam transmitted in (a) to each of the receive beams to the azimuth dimension.

10. The method of claim 9 wherein (a) and (b) comprise transmitting and receiving from a multi-dimensional array, and wherein (c) comprises applying apodization with a first greater amount of taper along the azimuth dimension for angles closer to the azimuth dimension and applying apodization with a second greater amount of taper along the elevation dimension for angles closer to the elevation dimension.

11. The method of claim 9 wherein (a) and (b) comprise transmitting and receiving from a multi-dimensional array, and wherein (c) comprises applying an azimuth apodization and an elevation apodization relative to the multi-dimensional array, where the azimuth apodization is more uniform for angles more perpendicular to the azimuth dimension and where the elevation apodization is more uniform for angles more perpendicular to the elevation dimension.

12. The method of claim 1 wherein (c) comprises varying the different apodization as a function of range.

13. The method of claim 1 further comprising:
filtering detected data of the receive beams, the filtering varying as a function of position of each of the receive beams relative to the transmitted convergent, focused beam.

14. The method of claim 13 further comprising:
filtering the detected data of the receive beams, the filtering varying as a function of range.

15. A system forming multiple receive beams for rapid acquisition, the system comprising:
a transducer array;
a transmit beamformer operable to cause the transducer away to transmit a convergent, focused beam of acoustic energy; and
a receive beamformer operable to form a plurality of receive beams in response to the transmitted convergent, focused beam, wherein the plurality of receive beams are formed with a different apodization profile of channel signals for at least a first one of the plurality of receive beams than for at least a second one of the plurality of receive beams.

16. The system of claim 15 wherein the transducer away comprises a multi-dimensional transducer array, and wherein the receive beamformer is operable to form the plurality of receive beams distributed along azimuth and elevation dimensions in a volume.

17. The system of claim 15 wherein the receive beamformer is operable to apply apodization as a function of respective angles in the elevation and azimuth dimensions from first line to a second line along the azimuth dimension, the first line being from a center of the converging, focused beam transmitted in (a) to each of the receive beams, respectively.

18. A method for forming multiple receive beams for rapid acquisition, the method comprising:
(a) transmitting a beam of acoustic energy;
(b) forming a plurality of receive beams in response to the transmitted beam of (a), the plurality of receive beams distributed along azimuth and elevation dimensions in a volume; and (c) performing (b) with a different aperture position for at least a first one of the plurality of receive beams than for at least a second one of the plurality of receive beams, both formed in response to the transmitted beam.

19. The method of claim 18 further comprising:
(d) repeating (a), (b), and (c) at least twenty times for a single scan of a volume of interest, each repetition corresponding to different sub-regions within the volume of interest.

20. The method of claim 18 further comprising:
(d) performing (b) with a different apodization for at least the first one of the plurality of receive beams than for at least the second one of the plurality of receive beams.

21. The method of claim 18 wherein (c) comprises centering the aperture position of each of the plurality of receive beams at a respective origin for each of the plurality of receive beams.

22. The method of claim 18 wherein (b) comprises forming the plurality of receive beams with spatial off-sets from lines of interest, an amount of the off-sets being a function of a distance from a transmit center to the respective line of interest.

23. The method of claim 18 further comprising:
filtering detected data of the receive beams, the filtering varying as a function of position of each of the receive beams relative to the transmitted convergent, focused beam.

24. The method of claim 23 further comprising:
filtering the detected data of the receive beams, the filtering varying as a function of range.

25. A system for forming multiple receive beams for rapid acquisition, the system comprising:
a multi-dimensional transducer array;
a transmit beamformer operable to cause the multi-dimensional transducer away to transmit a beam of acoustic energy; and
a receive beamformer operable to form a plurality of receive beams in response to the transmitted beam, the plurality of receive beams distributed along azimuth and elevation dimensions in a volume, wherein a first one of the plurality of receive beams is formed with a different aperture position than at least a second one of the plurality of receive beams.

26. The system of claim 25 wherein the receive beamformer is operable to center the aperture position of each of the plurality of receive beams at a respective origin for each of the plurality of receive beams.

* * * * *